Patented Aug. 30, 1949

2,480,680

UNITED STATES PATENT OFFICE 2,480,680

TERNARY INTERPOLYMERS OF VINYLIDENE CHLORIDE, ALPHA-METHYL STYRENE AND ACRYLONITRILE

George William Stanton, Contra Costa County, Calif., and Charles Everett Lowry, Midland, Mich., assignors to The Dow Chemical Company, Midland, Mich., a corporation of Delaware No Drawing. Application August 9, 1948, Serial No. 43,342

3 Claims. (Cl. 260—80.5)

This invention relates to new and useful ternary interpolymers of vinylidene chloride, alpha-methyl styrene and acrylonitrile.

We have found that useful ternary polymers may be made in neutral or acid aqueous emulsions by polymerizing together from 10 to 60 per cent vinylidene chloride, 10 to 60 per cent alpha-methyl styrene, and 30 to 80 per cent acrylonitrile. Within this range of compositions are found (I) ternary interpolymers useful for extrusion, molding and coating operations and (II) other ternary interpolymers useful, in the form of their solutions, for spinning fibers from which valuable textiles may be produced. The first class of interpolymer (I) is derived from monomeric mixtures of from 10 to 60 per cent vinylidene chloride, from 60 to 10 per cent of alpha-methyl styrene, and from 30 to 45 per cent of acrylonitrile. The second class of interpolymer (II) is derived from monomeric mixtures of from 10 to 45 per cent vinylidene chloride, from 45 to 10 per cent of alpha-methyl styrene, and from 45 to 80 per cent of acrylonitrile.

We have found that no appreciable amount of polymeric product is obtained, when polymerization is carried out in the conventional acidic or neutral aqueous emulsion, if less than 30 per cent of acrylonitrile is present in the mixture of monomers, and that when an interpolymer is produced with less than 30 per cent acrylonitrile, the rate of polymerization is so low as to be impractical, but that, within the range of proportions stated above, a satisfactorily high rate of polymerization may be obtained and the products have an interesting combination of properties.

The conventional polymerization procedure, referred to above, and employed to make the new copolymers, generally consists in dissolving 1.5 parts of emulsifying agent in 100 parts of water, by weight, and adding thereto 50 parts by weight of the mixture of monomers under investigation together with 0.25 part of potassium persulfate catalyst, agitating the mixture to provide initial emulsification, heating the emulsion to a polymerization temperature, suitably about 55° C., and maintaining this temperature until polymerization is essentially complete. The resulting latex may be used for coating purposes, or it may be diluted with water and mixed with a brine solution to effect coagulation of the polymer solids which may then be washed and recovered in a purified form for use in plastics operations, in solvent-applied coatings, or in fiber spinning operations, with or without added effect materials such as stabilizers, plasticizers, or coloring agents.

Among the tests for utility as plastics for extrusion and molding operations, referred to in the following examples, are the absolute viscosity, the heat distortion temperature, and flow characteristics. The absolute viscosity is computed from the specific viscosities of solutions of one gram of the polymer in 100 milliliters of isophorone at 30° C. The heat distortion temperature is taken as that temperature at which a one-inch molded strip of the polymer, supported at its ends, sags 0.005 inch at its center. The plastic flow is measured in a standard Tinius-Olsen flow tester, and is reported as the time in seconds required for a standard sample to flow one inch at a temperature of 150° C. under a pressure of 1000 pounds per square inch. Most commonly, a general purpose molding plastic should have an absolute viscosity below 10 (preferably near 5), a heat distortion temperature above 75° C., and a flow time under 400 seconds (preferably under 300 seconds). Plastics with viscosities of 10 or higher and with flow times of 400 seconds or longer are not adapted to extrusion and molding operations, especially if they tend to undergo thermal decomposition upon prolonged exposure to elevated temperatures.

All of the new interpolymers, regardless of their plastic characteristics, are soluble in a number of solvents to form solutions useful for coating purposes or for producing fibers by dry or wet spinning technics. The polymers of Class II, which have too great a resistance to flow to be valuable as molding plastics, yield particularly desirable fibers when spun from solutions in one or a mixture of such solvents as dioxan, isophorone, cyclohexanone, tetrahydrofuran, tetrahydropyran, dimethyl formamide, methylene thiocyanate, malononitrile, N,N-dimethyl cyanamide, and the like.

The following table reports the significant properties of a few representative interpolymers of the present invention as well as several interpolymers outside the useful range of the invention. The interpolymers were all prepared following the above-outlined standard procedure, using sodium lauryl sulphate as the emulsifier and a temperature of 55° C.

Table I

| Monomeric Mixture, Per Cent | | | Time, hours | Yield, Per Cent | Viscosity, Absolute Centipoises | Time for 1 inch flow at 150° C. and 1,000 pounds, in seconds | Heat Distortion Temperature | Class of Polymer |
|---|---|---|---|---|---|---|---|---|
| Vinylidene chloride | α-Methyl styrene | Acrylo-nitrile | | | | | | |
| 0 | 100 | 0 | 116 | ¹0 | | 483 | 95 | II |
| 10 | 45 | 45 | 116 | 97.9 | 5.97 | over 1,200 | 97 | II |
| 12.5 | 12.5 | 75 | 72 | 100 | (²) | | | 0 |
| 12.5 | 75 | 12.5 | 72 | ¹0 | | | | II |
| 18.75 | 18.75 | 62.5 | 72 | 100 | (²) | 1,110 | 94 | I |
| 20 | 40 | 40 | 116 | 98.5 | 5.39 | 360 | 93 | I |
| 20 | 40 | 40 | 96 | 87.2 | 5.47 | | | I |
| 25 | 25 | 50 | 72 | 99.2 | (²) | 513 | 91 | II |
| 25 | 50 | 25 | 72 | (¹) | | | | 0 |
| 30 | 25 | 45 | 72 | 98.9 | 7.91 | 400 | | II |
| 30 | 35 | 35 | 116 | 100 | 4.29 | 206 | 84 | I |
| 30 | 40 | 30 | 72 | | 2.87 | | | I |
| 40 | 20 | 40 | ³72 | 98.3 | 7.94 | 323 | 85 | I |
| 40 | 20 | 40 | ³20 | 96.7 | 8.23 | 300 | | I |
| 40 | 40 | 20 | 72 | ¹34.6 | | | | 0 |
| 40 | 15 | 35 | 72 | 98.7 | 7.10 | 250 | 78 | I |
| 50 | 25 | 25 | 72 | ¹31.6 | | | | 0 |
| 50 | 35 | 15 | 72 | ¹10.8 | | | | 0 |
| 50 | 20 | 20 | 24 | ¹6.3 | | | | 0 |
| 60 | 15 | 15 | 116 | ¹12.8 | | | | 0 |
| 70 | 15 | 15 | 72 | ¹8.8 | | | | 0 |
| 80 | 5 | 15 | 24 | ¹3.0 | | | | 0 |
| 80 | 10 | 10 | ⁴24 | ¹0.9 | | | | 0 |
| 90 | 5 | 5 | ⁴116 | ¹5.4 | | | | 0 |

¹ Too low conversion to polymer to be practical, considering the length of exposure.
² Not soluble in the isophorone used for viscosity determinations.
³ Indicates that, in those mixtures which polymerize completely, only a short time is required.
⁴ Indicates that, in those mixtures which do not polymerize to a practical extent, longer exposure is not helpful.

The foregoing Table I shows and other data confirm that regardless of the ratio of alpha-methyl styrene to acrylonitrile in the new interpolymers, those which contain from 10 to 25 per cent vinylidene chloride have heat distortion temperatures over 90° C., those containing from 30 to 40 per cent vinylidene chloride have heat distortion values of about 85° C., and those containing larger amounts of vinylidene chloride within the present invention have heat distortion temperatures between 75° and 80° C. A similar analysis of all the data shows that, regardless of the amounts of vinylidene chloride and of alpha-methyl styrene in the interpolymers of the invention, those which have from 30 to 35 per cent acrylonitrile have flow times (in the described standard test) of about 200 seconds, those with 40 to 60 per cent acrylonitrile have flow times of about 300 to 500 seconds, and those with about 65 to 80 per cent acrylonitrile have flow times of the order of 1000 seconds. In the new copolymers, those containing 30 to 40 per cent acrylonitrile and 10 to 30 per cent vinylidene chloride have absolute viscosities of from about 3 to 6 centipoises, while those having the same amount of acrylonitrile and 40 to 60 per cent vinylidene chloride have viscosities from 4 to 8, and all of the new copolymers with over 45 per cent acrylonitrile have absolute viscosities over 6 centipoises.

The molding, melt-spinning and extrusion characteristics of the new interpolymers of class I are greatly improved, and the ability of the material to flow readily at fabricating temperatures is enhanced by the addition of an ester type of plasticizer. The presence of the plasticizer in the molded or extruded article does not soften or weaken the article. This is illustrated by the data in the following table II, wherein the interpolymer being tested is that obtained from a monomeric mixture of 40 per cent vinylidene chloride, 30 per cent alpha-methyl styrene and 30 per cent acrylonitrile.

Table II

| Plasticizer | Amount | Tensile strength, lbs./sq. in. | Elongation, per cent | Shore Hardness "C" | 1-inch flow time 150° C. and 1000 lbs. in seconds |
|---|---|---|---|---|---|
| None | | 4,888 | 2 | 100 | 78 |
| Tricresyl phosphate | 10 | 4,062 | 2 | 100 | 39 |
| Ethyl phthalyl ethyl glycolate | 10 | 5,528 | 2 | 100 | 47 |
| Dioctyl phthalate | 10 | 6,135 | 0 | 100 | 19 |

The above-noted result is typical of the behavior of the other interpolymers when plasticized. Thus, one interpolymer having a flow time, in the standard test, of 296 seconds, could be plasticized with 20 per cent tricresyl phosphate to give a product having a flow time of 21 seconds, while the tensile strengths of the unplasticized and plasticized materials, in the form of molded test bars, were 4930 and 4965 pounds per square inch, respectively.

Interpolymers of class II, being less readily adapted to molding, melt-spinning and plastic extrusion operations than those of class I, may nonetheless be dissolved to form solutions useful in making coatings or fibers of good strength and high resistance both to thermal distortion and to attack by commonly encountered dry-cleaning solvents and paint, varnish and lacquer thinners. Thus, the interpolymer obtained from a monomeric mixture of 20 per cent vinylidene chloride, 20 per cent alpha-methyl styrene and 60 per cent acrylonitrile, may be dissolved to form clear solutions in dimethyl formamide and mixtures thereof with dioxan. When the solution is pumped through fine spinnerets into an evaporative atmosphere in the usual dry spinning operation, there are formed continuous fibers or filaments of high strength and flexibility which are relatively inelastic and are adapted to the manufacture of textiles having a long wear life and a high resistance to the usual factors causing fabric deterioration.

The invention has been described with reference to interpolymers produced in neutral or acid aqueous emulsions. This has been done to provide a basis for fair comparison between the products of different composition. It has been found that many of the new interpolymers may be made by other polymerization procedures, as, for example, by mass polymerization, non-emulsified suspension or granular polymerization, or by polymerization in alkaline emulsions. Of the various methods, the one previously described is preferred because of the higher rate of polymerization and the greater uniformity of the polymer particles thereby obtained.

We claim:

1. A ternary interpolymer obtained by polymerizing together and substantially to completion a monomeric mixture of from 10 to 60 per cent vinylidene chloride, from 10 to 60 per cent alpha-methyl styrene, and from 30 to 80 per cent acrylonitrile.

2. A ternary interpolymer obtained by polymerizing together and substantially to completion a monomeric mixture of from 10 to 60 per cent vinylidene chloride, from 60 to 10 per cent alpha-methyl styrene and from 30 to 45 per cent acrylonitrile.

A ternary interpolymer obtained by polymerizing together and substantially to completion a monomeric mixture of from 10 to 45 per cent vinylidene chloride, from 45 to 10 per cent alpha-methyl styrene and from 45 to 80 per cent acrylonitrile.

GEORGE WILLIAM STANTON.
CHARLES EVERETT LOWRY.

No references cited.